Feb. 9, 1932.   A. C. REHBERGER   1,844,334
FOUNTAIN PEN STAND SWIVEL
Filed Sept. 11, 1928
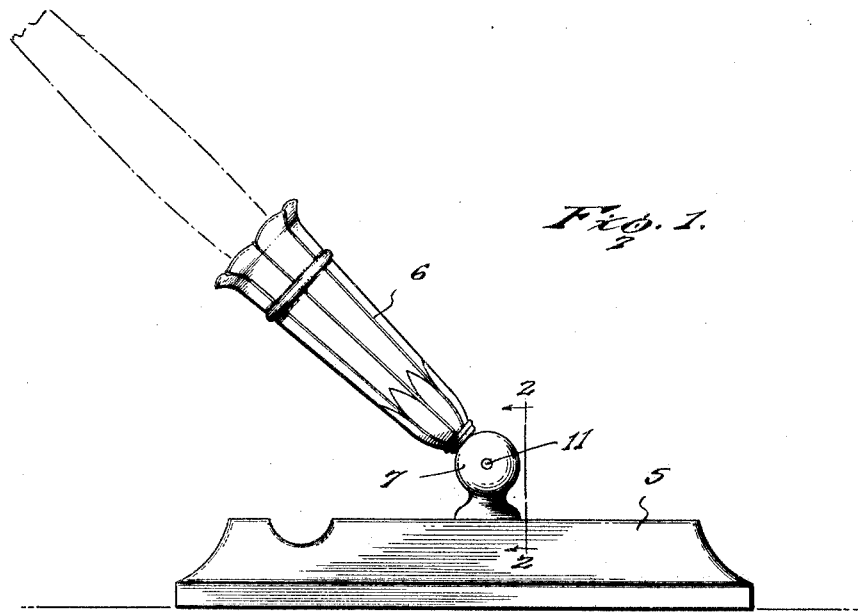
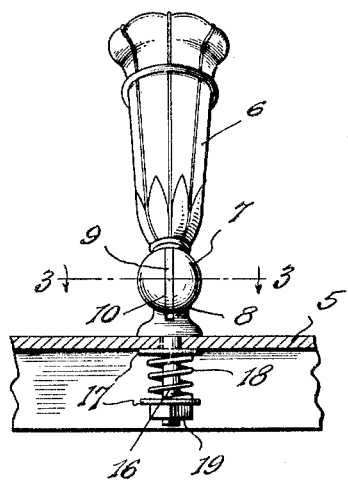
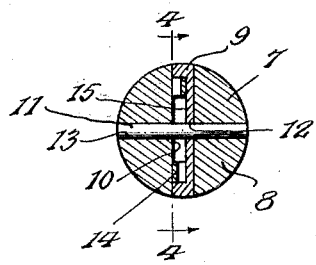
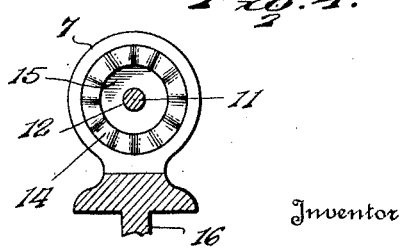
Inventor
Alfred C. Rehberger.
By Milburn & Milburn
Attorneys Patented Feb. 9, 1932

1,844,334

UNITED STATES PATENT OFFICE

ALFRED C. REHBERGER, OF CHICAGO, ILLINOIS, ASSIGNOR TO A. C. REHBERGER CO., OF CHICAGO, ILLINOIS, A CORPORATION OF ILLINOIS

FOUNTAIN PEN STAND SWIVEL

Application filed September 11, 1928. Serial No. 305,209.

My present invention relates to a fountain pen stand swivel.

The principal object of my invention is to provide a device of this type which will hold the fountain pen socket in any desired position, due to a fixed tension arrangement included in the swivel device.

A further object of the invention is the provision of a swivel which is permanently set at the required tension so that it cannot become loosened by accident or through continued use.

Still another object of the invention is the provision of a fountain pen stand swivel which can be readily and economically manufactured.

Other objects and advantages of the invention will be apparent from the accompanying specification and drawings, in which Figure 1 is a side elevation of a desk stand embodying my invention, Figure 2 is a side elevational view taken at right angles to Fig. 1 and showing the stand partly broken away, Figure 3 is an enlarged horizontal cross-sectional view taken on the line 3—3 of Fig. 2, and Figure 4 is an enlarged vertical cross-sectional view taken on the line 4—4 of Fig. 3.

In the drawings, wherein like numerals refer to similar parts throughout the several views showing the preferred embodiment of my invention, the numeral 5 indicates the base of a fountain pen desk stand provided with a penholding socket 6 of any desired type. The socket 6 is supported or connected to the base 5 by my preferred form of swivel, generically designated by the numeral 7.

The swivel 7 comprises a centrally slotted member 8 attached to the base 5 and a disk member 9 attached to the socket 6. Disk member 9 is adapted to fit within the slot 10 of member 8. The slotted member 8 is preferably rounded to give it a symmetrical appearance and the disk member 9 has a rounded periphery so that it will properly fit within member 8. The member 9 is pivotally supported in the slot 10 of member 8 by means of a pin 11 which extends through an aperture 12 at the center of disk 9, the pin 11 being carried in a transverse bore 13 in slotted member 8. A spring washer 14 is provided to frictionally engage the members 8 and 9 to hold the latter and the pen socket 6 at the desired angle, this washer 14 being fitted within a circular cut-out portion or pocket 15 in one face of the disk member 9. As is particularly shown in Figs. 3 and 4, the washer 14 is preferably radially corrugated and it thereby exerts a pressure between the walls of the slot 10 of member 8 and the faces of disk member 9, with the result that the socket 6 will always be tensioned to remain at any desired angle.

As shown in Fig. 2, the slotted member 8 is provided with a downwardly extending post 16 adapted to fit in an aperture in base 5. Post 16 is fitted with washers 17 and an intermediate coil spring 18. A nut 19 at the lower end of the post causes spring 18 to exert pressure against the upper washer 17 so that the latter bears against the lower surface of base 5 with sufficient friction or pressure to permit the socket 6 and slotted member 8 to be rotated by slight force and holds them in the desired position.

I claim:

The combination with a fountain pen desk stand comprising base and pen socket members, of a pivotal connection between the members comprising a slotted element attached to one of the members, a recessed disk element attached to the other member adapted to be fitted in the slot of the first-named element, the co-acting faces of said elements being smooth, and a spring washer within the recess of the disk element and acting between the slotted element and the disk element to resist relative movement.

ALFRED C. REHBERGER.